United States Patent [19]

Risse

[11] 3,986,704

[45] Oct. 19, 1976

[54] FLUID PROPELLER

[76] Inventor: Jean Risse, Maison 12, Medingen, Luxemburg

[22] Filed: May 22, 1974

[21] Appl. No.: 472,181

Related U.S. Application Data

[63] Continuation-in-part of Ser. No. 233,268, March 9, 1972, Pat. No. 3,813,083.

[52] U.S. Cl. .......................................... 259/6; 259/96; 259/186

[51] Int. Cl.² ...................... B01F 7/00; B01F 15/00; B01F 5/16; A23G 3/10

[58] Field of Search ................. 259/7, 8, 95, 96, 97, 259/23, 24, 43, 44; 416/186; 415/97

[56] References Cited

UNITED STATES PATENTS

| | | | |
|---|---|---|---|
| 1,645,614 | 10/1927 | Monahan | 416/186 |
| 1,982,002 | 11/1934 | Hatch | 259/96 |
| 2,276,404 | 3/1942 | Lundquist | 416/186 |
| 2,779,752 | 1/1957 | Vining | 259/8 X |
| 3,170,638 | 2/1965 | Burton | 259/96 X |
| 3,432,109 | 3/1969 | Geissel | 259/8 X |

FOREIGN PATENTS OR APPLICATIONS

| | | | |
|---|---|---|---|
| 905,232 | 9/1962 | United Kingdom | 259/95 |

*Primary Examiner*—Peter Feldman
*Assistant Examiner*—Robert Pous
*Attorney, Agent, or Firm*—John J. Dennemeyer

[57] ABSTRACT

An apparatus for propelling fluid, the apparatus including a rotatable propeller disposed within a container. The propeller has at least one entry collector in the form of a hollow cylinder open at one end and closed at the other. A plurality of conduits are aligned in at least one row, the conduits communicating with the entry collector by way of a similarly aligned row of openings. The conduits may be defined entirely within members which present only smooth surfaces to the surrounding fluid. The cumulative inner volumes of the conduits of one row is less than 33% of the volume of an annular body of revolution defined by that body of conduits when in rotation. Also, the inner volume of the entry collector is approximately equal to the cumulative inner volumes of the conduits of that row. The conduits may be positioned at angles other than 90° with respect to a motor shaft which drives the propeller. Also, two units may be arranged in mutually opposed relationship on a single motor shaft to provide special mixing effects.

2 Claims, 9 Drawing Figures

Fig. 1.
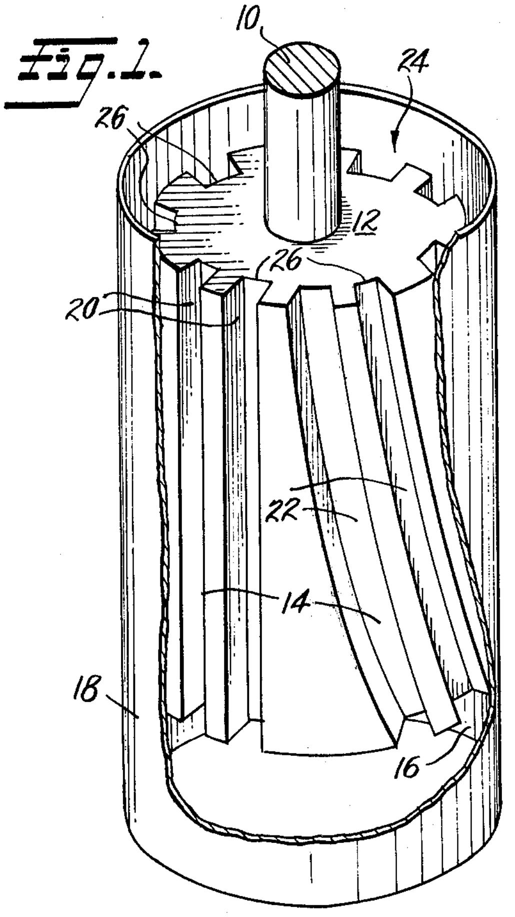
Fig. 2.
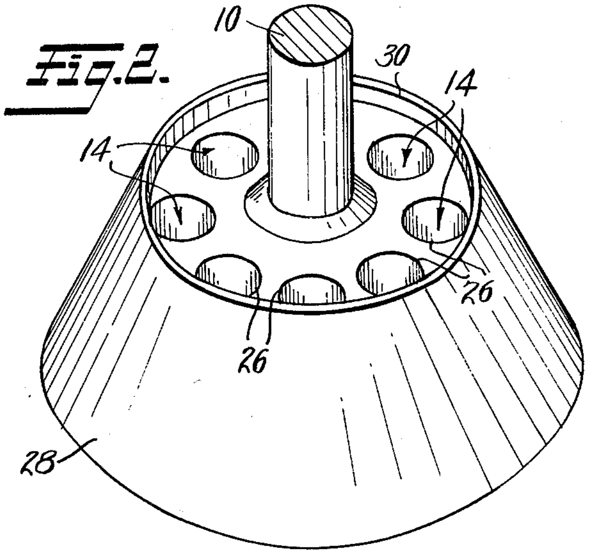
Fig. 3.
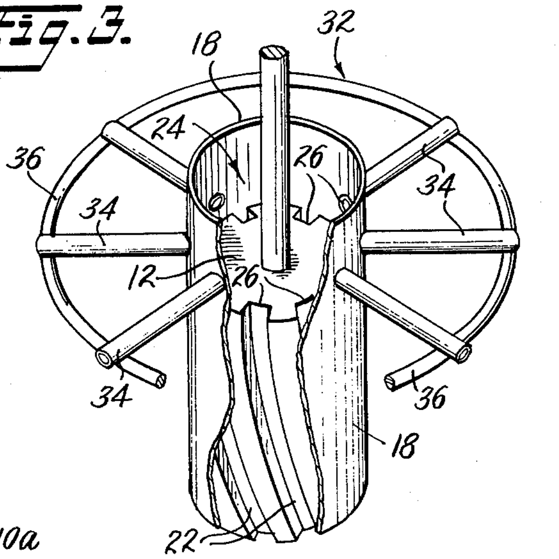
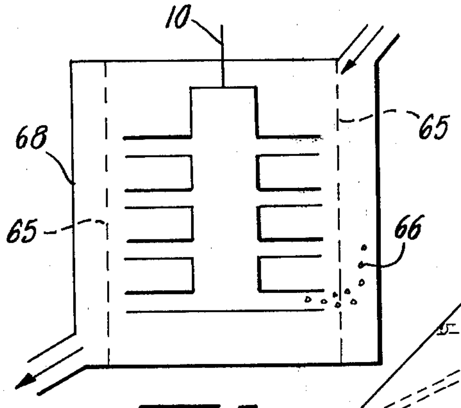
Fig. 9.
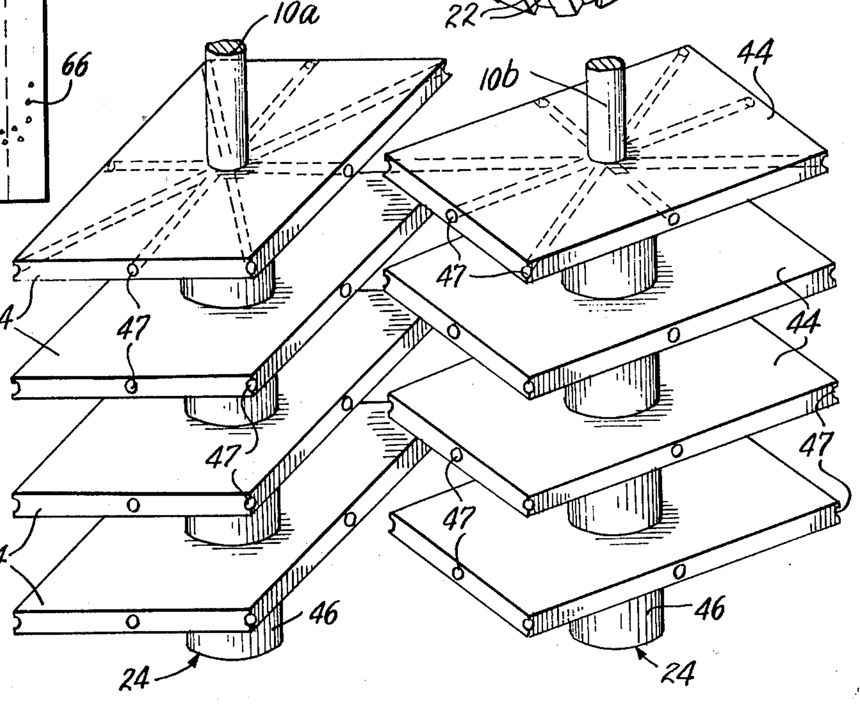
Fig. 5.

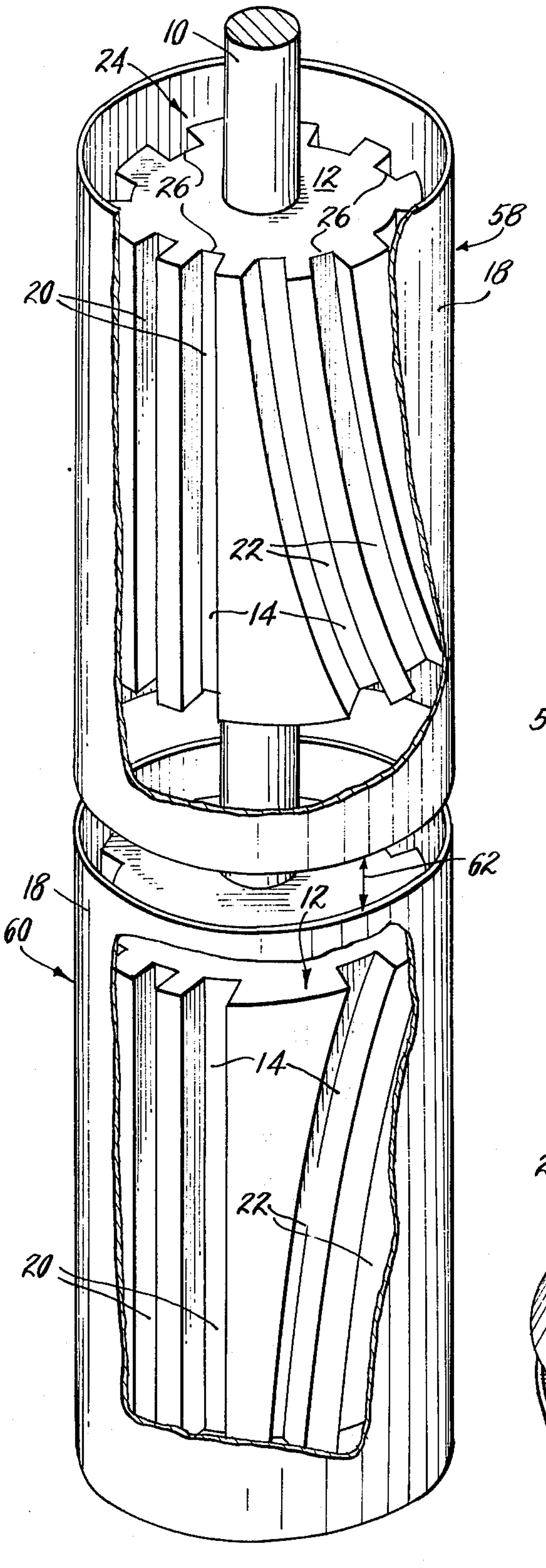
Fig. 7.
Fig. 4.
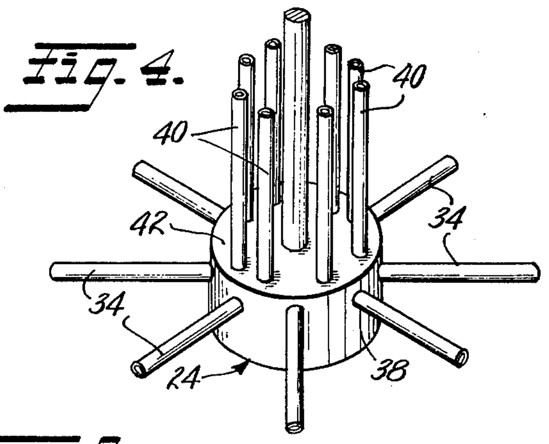
Fig. 6.
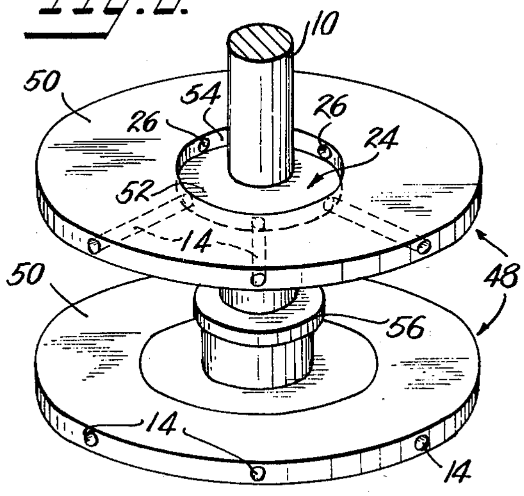
Fig. 8.
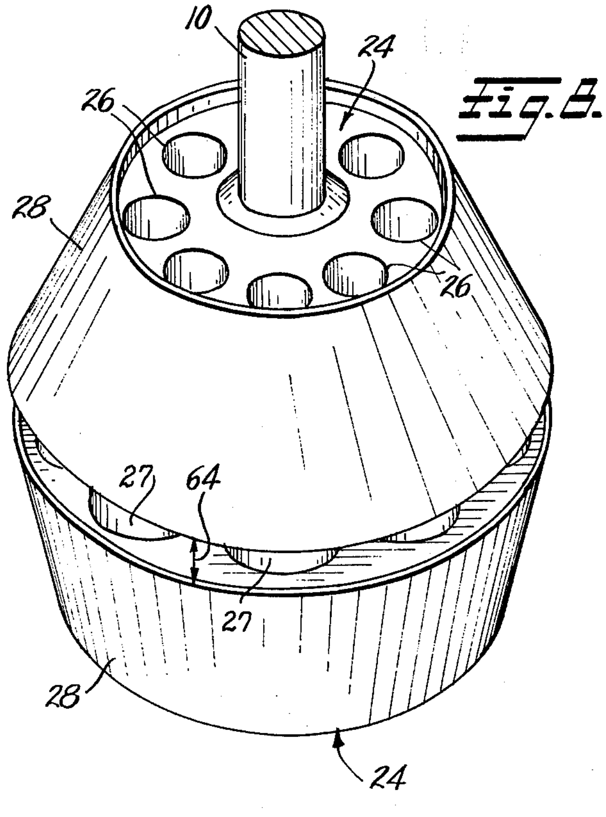

FLUID PROPELLER

CROSS-REFERENCE TO RELATED APPLICATIONS

This is a continuation-in-part of copending U.S. application Ser. No. 233,268, filed Mar. 9, 1972, and now U.S. Pat. No. 3,813,083. The disclosure of said patent is hereby incorporated by reference into the present application.

BACKGROUND OF THE INVENTION

1. Field of the Invention

The present invention relates to devices for propelling fluids to effect agitation, stirring, mixing, dissolving, emulsifying, dispersing or milling. In particular, the present invention relates to devices of the foregoing type wherein there is a central, rotary shaft and wherein fluids are propelled, at least to a certain extent, in other than radial directions with respect to the shaft.

2. Description of the Prior Art

It is known to immerse propeller devices in a fluid material to be treated and to rotate the devices in the material. The devices produce agitations, mixing, etc., by ejection of fluid from the circumferences of rotors or propellers, the ejected material impinging against ambient material.

SUMMARY OF THE INVENTION

The present invention improves upon known fluid propelling devices by achieving heretofore unknown efficiencies by way of increased and uniform acceleration and ejection of fluid material. In the device of the present invention, acceleration of material is improved by making the acceleration path particularly long, without materially increasing the size of the overall device. Acceleration and ejection is made more uniform by ensuring, in certain embodiments, that all the fluid travels through the same length acceleration path and also by ensuring that the fluid is accelerated without interference or disturbance from the backwash of the ambient material within which the acceleration occurs.

The foregoing results are achieved by the device of the invention which includes a rotatable propeller disposed within a container and at least one rotatable motor shaft connected therewith. The propeller has at least one entry collector which, preferably, takes the form of a hollow cylinder open at one end and closed at the other. The cylinder will preferably be concentrically disposed with respect to the motor shaft.

The entry collector includes a plurality of holes which are aligned in at least one row. A set of conduits are associated with the holes in the entry collector, and the conduits are also aligned in at least one row. Preferably, the conduits will be completely enclosed by a means which presents a smooth, unitary surface to the surrounding, ambient fluid.

Another aspect of the present invention involves the discovery that maximum efficiency may be achieved if various elements are proportioned such that the cumulative inner volumes of the conduits of one row are less than 33% of the volume of an annular body of revolution defined by that one row of conduits when in rotation. It has further been discovered that efficiency is maximized when the inner volume of the entry collector is approximately equal to the cumulative inner volumes of the conduits of the one row.

In certain embodiments of the present invention two or more separate propeller units are combined in a mutually opposed relationship on a single shaft to provide special mixing effects.

Finally, the best results have been achieved by positioning the conduits at angles other than 90° with respect to the motor shaft.

BRIEF DESCRIPTION OF THE DRAWING

FIG. 1 is a perspective, cut-away view of one embodiment of the fluid propeller of the invention.

FIG. 2 is a perspective view illustrating another embodiment of the invention wherein the conduits are positioned at angles other than parallel or perpendicular to the motor shaft.

FIG. 3 illustrates a further embodiment of the propeller of the invention wherein components are both radial and axial ejection are combined.

FIG. 4 is a perspective view of a modified version of the device of FIG. 3, the axial ejection components taking the form of straight, tubular conduits.

FIG. 5 is a perspective view of another embodiment of the invention wherein the conduits are disposed within two sets of cooperating rectangular plates on a pair of motor shafts.

FIG. 6 illustrates another embodiment wherein a pair of propellers are fixed on a single shaft.

FIG. 7 illustrates yet a further embodiment wherein two propellers as per FIG. 1 are fixed on a single shaft.

FIG. 8 illustrates another embodiment wherein two propellers as per FIG. 2 are fixed on a single shaft.

FIG. 9 illustrates still another embodiment wherein milling bodies are used within the medium to be heated.

DETAILED DESCRIPTION OF THE DRAWINGS

In the following description and in the drawings, like reference characters, when used in connection with different figures of the drawing, refer to like elements and/or features.

Referring to FIG. 1, there is shown a rotatable motor shaft 10 connected to a cylindrical member 12 which serves as a body for partially defining and partially enclosing a plurality of conduits 14. More specifically, the conduits are defined by elongated slots in cylindrical member 12 and by the inner surface 16 of an outer cylinder 18 which surrounds and encloses cylindrical member 12. Taken together, cylindrical member 12 and outer cylinder 18 (within which the conduits are entirely defined) present smooth surfaces to the surrounding ambient fluid.

As will be apparent from FIG. 1, the slots forming conduits 14 may have different relative positionings and/or configurations. For instance, the slots may have rectangular configurations and parallel dispositions with respect to motor shaft 10, as indicated by reference numeral 20. Also, they may have curved, generally helical configurations and dispositions as indicated by reference numeral 22. The device according to FIG. 1 may be constructed with several concentric rows of conduits on a single propeller.

Outer cylinder 18 may extend beyond cylindrical member 12 to form an entry collector 24 in the hollow area defined by this outward extension of cylinder 18. A series of inlet openings 26 are defined in entry collector 24 by the ends of slots 20, 22. As will be apparent from the drawing, these openings are disposed in a single, circular row in the embodiment of FIG. 1.

The entire propeller apparatus, including the entry collector and conduits, is positioned in a container (not illustrated in FIG. 1) of fluid to be treated. In operation, the propeller rotates within the container of fluid, whereupon fluid flows into entry collector 24, through openings 26, and thence through conduits 14 to be accelerated in the conduits and ejected therefrom at high speed to effect agitation, mixing, etc.

FIG. 2 illustrates an embodiment of the invention similar to that of FIG. 1, but where the conduits are formed entirely within a truncated, conical member 28 which corresponds, in many respects, to the combined cylindrical member 12 and outer cylinder 18 of the embodiment of FIG. 1. In the embodiment of FIG. 2 the conduits 14 have generally circular cross-sections, and their axes are disposed other than parallel or perpendicular to the axis of motor shaft 10.

An upward extension 30 at the outer surface of conical member 28 serves in defining the entry collector 24. Again, inlet openings 26, which effect communication between the entry collector and conduits, are formed by the upper ends of the conduits and are arranged in a circular row. The operation and flow of fluid in the embodiment of FIG. 2 will be essentially the same as that described in connection with the embodiment of FIG. 1.

In FIG. 3, there is shown an embodiment for effecting both axial and radial ejection of material. As illustrated, this embodiment includes a cylinder member 12, outer cylinder 18 and a series of helical grooves 22 which, together, provide an axial ejection propeller of essentially the same type disclosed in FIG. 1. In addition, however, the device of FIG. 3 includes a radial ejection propeller coupled with the entry collector for the axial ejection propeller.

The radial ejection propeller (referred to generally by reference numeral 32) includes a plurality of tubular members 34 forming the conduits of the propeller, the radially intermost portions of members 34 being joined to that portion of outer cylinder 18 which defines entry collector 24. The tubular members are open at their inner ends so that a circular row of openings 26 is formed in the inner wall of the entry collector. It is to be noted that, in the embodiment of FIG. 3, there are actually two circular rows of openings 26, one row being formed in the top surface of cylindrical member 12 by the ends of grooves 22, the other being formed by the ends of tubular members 34, as just described. The outer extremities of tubular members 34 may be connected by a reinforcement ring 36.

Again, in operation, the entire device is positioned in a container and rotated in the material to be treated. The operation of the axial device is essentially the same as described above in connection with FIG. 1. As to the radial propeller portion, material passes from the entry collector and through the conduits to be ejected by centrifugal force from the peripheral extremities of the conduits defined by tubular members 34.

FIG. 4 illustrates another form of propeller including both radial and axial rows of conduits. The radial portion of the propeller of FIG. 4 is essentially the same as that of FIG. 3. The entry collector 24, however, is not defined by an extension of an outer cylinder, but instead, is defined by a separate, hollow, cylindrical member 38. In the previously described embodiments, the entry collector is open on its upper end (i.e., the end from which the motor shaft extends outwardly). In the embodiment of FIG. 4, however, the entry collector is open at the lower end. The axial conduits are defined by a plurality of vertical tubular members 40 attached to a horizontal circular surface 42 of the entry collector. As in the case of the FIG. 3 embodiment, there will be two, separate, circular rows of openings within the entry collector.

The operation of the embodiment of FIG. 4 will be essentially the same as that previously described, except that fluid will enter the entry collector from the bottom.

The embodiment of FIG. 5 illustrates a propeller arrangement including two separate shafts **10*a*, 10*b*, each shaft including multiple rows of conduits of the same type. As illustrated, each row of conduits is defined within a horizontal, rectangular plate 44, the plates associated with each shaft being arranged in a vertically spaced relationship. The two motor shafts 10*a*, 10*b*** are arranged so that the plates associated with one shaft are alternately interposed with the plates of the other shaft. That is, some of the plates of one shaft will rotate within the spaces between the plates of the other shaft and vice versa.

In the embodiment of FIG. 5 the entry collector associated with each shaft is formed by an especially elongated cylindrical member 46, and, again, the inlet thereto is at the bottom. Communication between the radially extending conduits within the horizontal plates and entry collectors 24 is effected by annular rows of openings disposed in a vertically tiered arrangement (not visible in FIG. 5). The rectangular plates of the embodiment of FIG. 5 may be positioned and/or operated to produce special effects, e.g., they may be rotated in the same or opposite directions.

In operation, streams of material ejected from the rows of conduits associated with one propeller shaft of FIG. 5 will meet streams of material ejected from the rows of conduits associated with the other shaft. The rotation of the two shafts causes their respective conduit outlets 47 to move successively away from and toward one another. When conduit outlets 47 associated with different shafts are close to one another, streams of material flowing therefrom will meet in a headlong impingement or collision, and this action, coupled with the constantly increasing and decreasing distances between conduits outlets, produces what might best be described as a pulsating action. This pulsating action, in turn, provides special mixing and/or agitating effects which can be used to considerable advantage.

The embodiment of FIG. 6 is a propeller arrangement wherein two single propeller units 48 are coupled to one shaft in a mutually opposed relationship. Each propeller unit includes a circular disc element 50 having a central recessed area 52 which defines the entry collector 24. In a circumferential wall 54 of the entry collector is formed an annular row of openings 26. A plurality of conduits 14, each of which has a circular cross section, are defined entirely within each circular disc. The conduits extend radially outwardly from openings 26 in the entry collector to the outer periphery of each disc.

The individual propeller units 48 of the embodiment of FIG. 6 are disposed on the shaft so as to face in opposite directions. More particularly, the entry collector of the upper disc opens upwardly so that fluid material will flow into the collector from the top, whereas the entry collector of the lower unit faces downwardly so that fluid will flow thereinto from the bottom. The individual propeller units of FIG. 6 are attached to shaft 10 by a collar 56 which may serve as additional buoy.

Any of the foregoing embodiments effecting radial ejection may also be constructed to effect axial ejection. For instance, a pair of axial ejection devices as per FIG. 1 may be combined on a single shaft in a mutually opposed relationship (in the fashion suggested by FIG. 6) and such a device is represented by the embodiment of FIG. 7.

The two axial ejection units of the device of FIG. 7 are arranged to eject material in directly opposed streams. Specifically, the upper unit, referred to generally by reference numeral 58, draws material into the entry collector at the upper end and ejects material toward the lower unit. Conversely, the lower unit referred to generally by reference numeral 60, draws in material from the entry collector in its lower end and ejects the material toward the upper unit. This mutually opposed relationship effects a headlong impingement or collision of streams of material to thereby provide an especially effective agitation, mixing, etc. The material processed in this fashion passes through space 62 between the outer cylinders 18 of the upper and lower units and into the surrounding container.

Just as two axial units may be coupled in a mutually opposed relationship in the fashion suggested by FIG. 6, so, too, may a pair of units as per the embodiment of FIG. 2 be coupled together in a mutually opposed relationship, again in the fashion suggested by FIG. 6. Such a device is represented by the embodiment of FIG. 8. As will be apparent from FIG. 8, the two propeller units are mounted proximate each other on the motor shaft but spaced slightly apart from each other. Thus, each discharge opening 27 of one propeller unit will be adjacent to a discharge opening of the other propeller unit. Similarly, it will also be apparent from the drawing that this vertical spacing arrangement provides an endless, continuous, open space or slot 64 around the periphery of the fluid propeller. As also apparent from the drawing, the slot is circumferentially disposed with respect to the axes of the motor shaft, and the slot is very narrow in relation to its circumference. More precisely, and as will further be apparent from the drawing, the width of the slot, as taken in a direction parallel to the axis of the motor shaft, is substantially less than the height of either propeller unit as taken in the same direction.

It will be recalled that each individual propeller unit as per FIG. 2 includes a row of conduits in a truncated, concial member, each conduit being disposed other than parallel or perpendicular to the axis of the motor shaft. That is, each conduit, and in particular the central axis of each conduit, is disposed at an incline with respect to the vertical axis of the motor shaft. Of course, as is clear from the drawing, the inclined conduits of one propeller unit diverge downwardly toward endless slot 64 and the inclined conduits of the other propeller unit diverge upwardly toward endless slot 64. When units of this type are coupled to a single shaft in the manner illustrated in FIG. 8, the streams of material ejected from the individual units will again impinge upon each other in the area between the units to produce a very effective agitation, mixing, etc. It will be readily apparent from the foregoing and from the drawing that to effect the previously described headlong impingement or collision of oppositely flowing streams of material, each discharge opening of one propellor unit is in registry with a discharge opening of the other propeller unit. The ejected, mixed material will flow from the space or endless slot 64 between the individual units of the overall device of FIG. 8. Thus, endless slot 64 effects communication between the discharge openings of the conduits and the exterior of the fluid propeller.

As another variation on the embodiments of the present invention, it is possible to combine a rotating propeller, operating as a rotor, with a fixed stator which may be a grid through which material to be treated is forced as schematically shown in FIG. 9 and as indicated by reference character 65. The stator may, for example, consist of milling bodies of sand, glass beads, etc., added to the material to be treated and forming a mobile or semi-fixed stator which acts similarly to a fixed stator.

Thus, FIG. 9 illustrates a propeller apparatus including a plurality or tiered rows of conduits through which milling bodies 66 may pass. It is to be noted that milling bodies 66 may also circulate through container 68, within which the propeller of the embodiment of FIG. 9 rotates. Milling bodies or, more generally the above described stators, may also be combined with any of the foregoing non-perpendicular embodiments to provide numerous and varied advantages.

It is to be noted that, in the embodiments of FIGS. 2, 5, 6, and 8, each row of conduits is defined entirely within a single, unitary member (e.g., conical member 28 of FIGS. 2 and 8, rectangular plates 44 of FIG. 5 and circular disc element 50 of FIG. 6). Each such unitary member presents only smooth, uninterrupted surfaces to the exterior to thereby enhance efficiency of operation. Preferably, each unitary member is entirely solid except for the conduits defined therewithin.

It is further noted that, in each of the axial units shown in FIGS. 1, 3, and 7, a plurality of conduits of one row are partially defined along their entire length by one unitary member (i.e., cylinder member 12 having grooves 20, 22 therein) and are completely defined along their entire length by this one member in conjunction with another unitary member (i.e., outer cylinder 18). The two members, together, again present only smooth surfaces to the surrounding fluid to thereby enhance efficiency.

It will be understood that the ejection conduits of the various embodiments may be provided with deflectors at their outlets (not shown). These deflectors may be used to divert ejected material in directions other than along the axes of the ejection conduits.

In the devices embodying the present invention, remarkably high ejection speeds are obtained even with relatively low rotation speeds of the propellers. The material immediately surrounding the members in which the conduits are defined is subjected to practically no acceleration because of the smooth outer shape of these members. Narrow streams, energetically ejected from the propellers, produce friction and shearing actions in the ambient material surrounding each propeller. This material is vigorously agitated, stirred, mixed, dispersed, homogenized or propelled by way of high energy streams of material accelerated while sheltered from the ambient media, but in the very midst of the latter. The material, therefore, is accelerated without being subjected to disturbing swirls of ambient media so that high acceleration is achieved with a relatively small power input.

It is to be noted that a given propeller, rotating at a given speed is, to a certain extent, adjustable in its volume handling capacity and in its power requirements by regulation of the number and size of conduits.

It is an important aspect of the present invention that the cumulative space of the inner volumes of all the conduits of one single row is less than 33% of the space or volume generated by two planes essentially perpendicular to the motor shaft and positioned immediately above and under this row of conduits (excluding the space or volume generated by the central, cylindrical portions from which the conduits extend). In conjunction with the foregoing, it is also an important aspect of the invention that the aforesaid central, cylindrical portion occupies a space or volume approximately equal to the space or volume of the aforesaid row of conduits.

In the treatment of fluid materials, it is advantageous to use speeds of rotation below 750 r.p.m., and indeed, it has been found that a very fast and thorough mixing can be achieved at a low rate of power consumption at rotation speeds below 500 r.p.m.

As an example of how materials behave when processed by a device according to the present invention, let it be assumed that the container is loaded up to the level of the upper row of conduits (assuming also that an embodiment having multiple rows of conduits is used). At start-up the upper row of conduits will eject unmixed material (designated as neutral) against other neutral material to form what will be referred to as a primary mix.

At the start, every other row of conduits operates similarly. However, as soon as the material ejected by the first row of conduits travels downwardly (and the downward movement may be effected or enhanced, for example, by deflectors at the ends of the conduits) to the level of the second row of conduits, the conduits of the second row eject neutral material against the primary material to form a mix designated as secondary. This downward movement of already ejected and mixed material, leads to production of more and more complex mixes.

The complexedly mixed materials reach the bottom of the container to then be drawn into the entry collector (assuming an embodiment having a bottom entry collector is used). The materials are sucked up through the entry collector to be again ejected by the conduits.

Henceforth, each of the conduits will eject no more neutral material, but instead, will eject material which has already been subjected to a number *n* of mixes, *n* representing the number of rows of conduits.

The material which has been *n* times mixed and ejected by the upper row of conduits forms a continuous liquid ring between the peripheries of the conduits of that row and the container wall. Therefore, any neutral material located above the upper row of conduits cannot penetrate into the mixing circuit until it has been subjected to the action of the aforesaid continuous liquid ring, *n* times mixed.

As a variation on the foregoing, if the container is loaded up to the level of the upper row of conduits but there is both an intake and ejection of neutral material at approximately this level, then no portion of the neutral material may pass through the ejection circuit without first being positively subjected to the mixing phases. This is true except in the case where the propeller is designed to circulate a greater volume of neutral material than that which can be delivered by the conduits.

While throughout the above description words such as "vertical," "horizontal," "upper," "lower," "top," and "bottom" have been used, it will be understood that these terms are used only to describe relative relationships and are not intended to be limiting. It will also be understood that those skilled in the art may make many changes and modifications to the above-described embodiments without departing from the spirit and scope of the invention.

What is claimed is:

1. An apparatus for propelling fluids within a container comprising:

a. a motor shaft having a vertical axis;

b. first and second propeller units mounted proximate each other on said motor shaft but spaced slightly apart from each other;

c. each propeller unit including a plurality of elongated conduits therein, each conduit being disposed at an incline with respect to said vertical axis of the motor shaft;

d. said conduits defining inlet openings at one end of each propeller unit and outlet openings at the other end of each propeller unit;

e. the vertical spacing between said propeller units providing and endless, continuous, open slot around the periphery of the fluid propeller, said slot being circumferentially disposed with respect to said axis of said motor shaft and being narrow in relation to its circumference, said slot effecting communication between said discharge openings of said conduits and the exterior of the fluid propeller, the width of said slot, as taken in a direction parallel to the axis of said motor shaft, being substantially less than the height of either one of said propeller units as taken in the same direction;

f. the incline of said conduits of said first propeller unit being in a downwardly diverging direction towards said endless slot, the incline of said conduits of said second propeller unit being in an upwardly diverging direction toward said endless slot, whereby generally oppositely flowing streams of fluid meet in the region of said narrow slot to produce intense agitation and mixing.

2. An apparatus for propelling fluids within a container as defined in claim 1 wherein each discharge opening of said first propeller unit is adjacent to and in registry with a discharge opening of said second propeller unit, whereby, when the fluid propeller is rotated, headlong impingement of generally oppositely flowing streams of fluid is effected to thereby increase agitation and mixing.

* * * * *